US008000734B2

(12) United States Patent
Roy et al.

(10) Patent No.: US 8,000,734 B2
(45) Date of Patent: *Aug. 16, 2011

(54) METHOD AND SYSTEM WHEREIN TIMESLOTS ALLOCATED FOR COMMON CONTROL CHANNELS MAY BE REUSED FOR USER TRAFFIC

(75) Inventors: Vincent Roy, Longueuil (CA); Paul Marinier, Brossard (CA)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/604,851

(22) Filed: Oct. 23, 2009

(65) Prior Publication Data

US 2010/0040039 A1 Feb. 18, 2010

Related U.S. Application Data

(63) Continuation of application No. 12/260,338, filed on Oct. 29, 2008, now Pat. No. 7,610,059, which is a continuation of application No. 11/268,925, filed on Nov. 8, 2005, now Pat. No. 7,447,517, which is a continuation of application No. 10/749,905, filed on Dec. 31, 2003, now Pat. No. 6,970,713.

(60) Provisional application No. 60/485,762, filed on Jul. 9, 2003.

(51) Int. Cl.
*H04W 52/18* (2009.01)
*H04W 52/30* (2009.01)
*H04W 16/02* (2009.01)

(52) U.S. Cl. ..... 455/522; 455/511; 455/434; 455/452.1; 455/447; 455/69; 370/337; 370/347

(58) Field of Classification Search ......................... None
See application file for complete search history.

(56) References Cited

U.S. PATENT DOCUMENTS

| 5,239,678 | A | 8/1993 | Grube et al. ............... 455/511 |
| 5,920,547 | A | 7/1999 | Werth ........................ 370/280 |
| 6,011,786 | A | 1/2000 | Dent ........................... 370/330 |
| 6,173,162 | B1 | 1/2001 | Dahlman et al. |
| 6,240,298 | B1 | 5/2001 | Hayata ....................... 455/511 |
| 6,272,352 | B1 | 8/2001 | Cerwall et al. ............. 455/511 |
| 6,334,047 | B1 | 12/2001 | Andersson et al. |
| 6,728,302 | B1 | 4/2004 | Dabak et al. ............. 455/137 X |
| 7,447,517 | B2 * | 11/2008 | Roy et al. .................. 455/522 |
| 7,610,059 | B2 * | 10/2009 | Roy et al. .................. 455/522 |
| 2002/0177462 | A1 | 11/2002 | Cao et al. |
| 2003/0196520 | A1 | 10/2003 | Locher |

FOREIGN PATENT DOCUMENTS

| JP | 03-242052 | 10/1991 |
| JP | 05-191336 | 7/1993 |
| JP | 10-136438 | 5/1998 |
| JP | 10-145871 | 5/1998 |
| WO | 98/31110 | 7/1998 |
| WO | 00/54533 | 9/2000 |
| WO | 01/24417 | 4/2001 |

* cited by examiner

*Primary Examiner* — Philip J Sobutka
(74) *Attorney, Agent, or Firm* — Volpe and Koenig, P.C.

(57) ABSTRACT

A method and system is disclosed wherein timeslots designated in a wireless communication system as Common Physical Channel (CPCH) timeslots may be reused for user traffic. A CPCH timeslot used in a first cell may be reused by a second cell, assuming the first and second cells transmit control information in different CPCH timeslots, for user traffic. The second cell is permitted to reuse the timeslot in which the first cell is transmitting control information so long as the second cell's reuse of that timeslot does not degrade reception of control information in the first cell.

7 Claims, 2 Drawing Sheets

METHOD AND SYSTEM WHEREIN TIMESLOTS ALLOCATED FOR COMMON CONTROL CHANNELS MAY BE REUSED FOR USER TRAFFIC

CROSS REFERENCE TO RELATED APPLICATION(S)

This application is a continuation of U.S. patent application Ser. No. 12/260,338, filed Oct. 29, 2008, which is a continuation of U.S. patent application Ser. No. 11/268,925, filed Nov. 8, 2005, which issued as U.S. Pat. No. 7,447,517 on Nov. 4, 2008, which is a continuation of U.S. patent application Ser. No. 10/749,905, filed Dec. 31, 2003, which issued as U.S. Pat. No. 6,970,713 on Nov. 29, 2005, which in turn claims benefit of U.S. provisional application No. 60/485,762 filed on Jul. 9, 2003, which are incorporated by reference as if fully set forth herein.

FIELD OF INVENTION

The present invention relates to wireless communication systems. More particularly, the present invention relates to optimizing available resources in wireless communication systems.

BACKGROUND

Wireless communication systems typically use a Broadcast Channel (BCH) to communicate control information to facilitate communications between wireless transmit/receive units (WTRUs) and the system. For example, the BCH is used to communicate to WTRUs information regarding the Radio Access Network (RAN) as well as information specific to the cell, even before the WTRUs are connected. In Time Division Duplex (TDD) type systems, for example, the BCH is transmitted on the Primary Common Control Physical Channel (PCCPCH). Wireless communication can also have other common control channels which are transmitted on Common Physical Channels (CPCH). For example, in TDD systems, the Forward Access Channel (FACH) is mapped on the Secondary Common Control Physical Channel (SCCPCH). Both PCCPCH and SCCPCH are examples of CPCH. The same reserved timeslots are typically used throughout a wireless communication system for transmitting the CPCH. It is noted that the term "CPCH timeslot" is used to refer to any timeslot that is used to transmit CPCH in the system.

Depending on the performance of the WTRUs as well as the RF isolation between cells, a TDD type system may be able to only use a single timeslot throughout the system to transmit its CPCH or it may have to use more than one timeslot to allow neighboring cells to use different timeslots and thus ensure good CPCH reception. The use of more than one timeslot to transmit a CPCH throughout a system is referred to as "CPCH timeslot reuse." On one hand, dedicating a certain number of timeslots strictly for purposes of transmitting the CPCH (i.e. forbidding their use for dedicated channels (DCH)) can lead to inefficient use of the spectrum that in turn translates into capacity loss. On the other hand, reusing CPCH timeslots to transmit DCH signals (i.e. user traffic or DCH traffic) is not done since it leads to highly interfered CPCH signals which could result into CPCH reception problems for WTRUs in some areas. Poor CPCH reception has many negative impacts on wireless communication systems. For example, poor CPCH reception may result in extended time periods for WTRUs trying to access the system, degradation of key radio resource management functions such as handoffs and power control, and service holes for the BCH and FACH.

In currently known wireless communication systems, a certain number of timeslots are dedicated solely for transmitting the CPCH with no attempt to reuse those timeslots for DCHs (i.e. user traffic). Therefore, it is desirable to have a method and system where timeslots used for transmitting the CPCH may be reused for user traffic.

SUMMARY

The present invention is a method and system wherein timeslots designated in a wireless communication system as Common Physical Channel (CPCH) timeslots may be reused for user traffic. A CPCH timeslot used in a first cell may be reused by a second cell, assuming the first and second cells transmit control information in different CPCH timeslots, for user traffic. The second cell is permitted to reuse the timeslot in which the first cell is transmitting control information so long as the second cell's reuse of that timeslot does not degrade reception of control information in the first cell.

BRIEF DESCRIPTION OF THE DRAWING(S)

DETAILED DESCRIPTION OF THE PREFERRED EMBODIMENT(S)

Hereafter, a wireless transmit/receive unit (WTRU) includes but is not limited to a user equipment, mobile station, fixed or mobile subscriber unit, pager, or any other type of device capable of operating in a wireless environment. When referred to hereafter, a base station (BS) includes but is not limited to a Node-B, site controller, access point or any other type of interfacing device in a wireless environment. Further, it is noted that, the notion of Common Physical Channel (CPCH) relates to transmission and/or reception of any type of control information and encompasses all common physical channels including Primary Common Control Physical Channel (PCCPCH) on which the broadcast channel (BCH) is transmitted and the Secondary Common Control Physical Channel (SCCPCH) on which the Forward Access Channel (FACH) is transmitted. When reference is made to CPCH timeslots, it is noted that the CPCH timeslots are the timeslots in which a CPCH is being transmitted. Further, when a cell is said to be handling user traffic, the cell may be transmitting, receiving, or transmitting and receiving user traffic.

In order to ensure adequate CPCH reception, wireless communication systems may have to dedicate a plurality of timeslots for the CPCH throughout the system. Allocating a plurality of timeslots as CPCH timeslots allows one cell, say cell A, to transmit its CPCH in a different timeslot than a neighboring cell, say cell B in order to reduce the amount of intercell interference perceived by the WTRU trying to detect the CPCH of one of the two cells. However, the CPCH timeslot used by cell A to transmit its CPCH is not used by cell B where cell B uses another CPCH timeslot to transmit its CPCH. As explained further in connection with method 200, however, the present invention enables cell B to handle user traffic in the CPCH timeslot used by cell A, and vice versa. That is, cell A may handle user traffic in the CPCH timeslot used by cell B.

Figure 1:
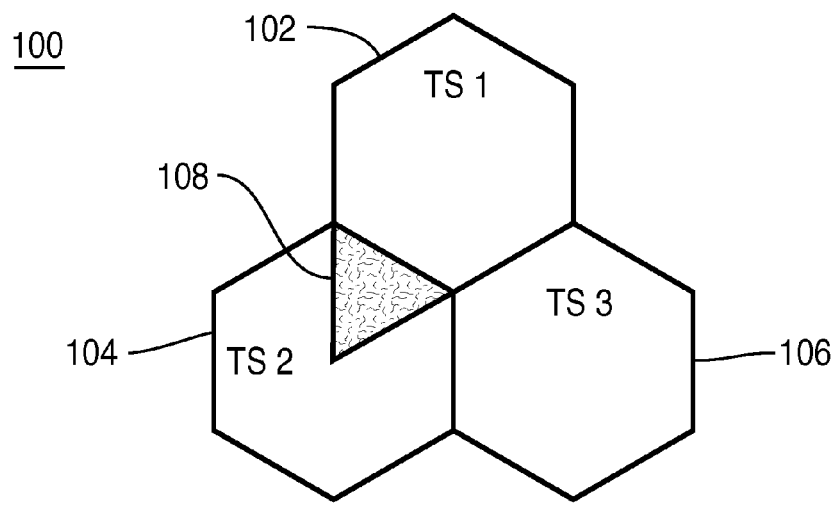
FIG. 1 is a diagram of three cells within a wireless communication system.

Referring initially to FIG. 1, there is shown three cells 102, 104, 106. Assume, the wireless communication system to which cells 102, 104, 106 belong has allocated timeslots 1, 2, and 3 for transmission of the CPCH. That is, timeslots 1, 2, and 3 are CPCH timeslots. Further assume that cell 102 is transmitting its CPCH in timeslot 1, cell 104 is transmitting its CPCH in timeslot 2, and cell 106 is transmitting its CPCH in timeslot 3.

According to the present invention, a particular cell may reuse CPCH timeslots used by other cells to transmit their CPCH, for purposes of handling user traffic in the particular cell, assuming the CPCH timeslots being used by the other cells to transmit CPCH are different from the CPCH timeslot being used by the particular cell to transmit its own CPCH. That is, taking cell 102 as an example, cell 102 is able to handle user traffic (i.e. DCH traffic) in timeslots 2 and 3 at a particular power level that will not result in unacceptable CPCH performance degradation in cells 104 and 106. Cells 104 and 106 will permit cell 102 to reuse their CPCH timeslots for user traffic so long as such reuse does not result in degradation of CPCH performance for their own users. The power level at which one cell may handle user traffic in a CPCH timeslot being used by another cell to transmit its CPCH is denoted $P_{max\_dch\_cpch}$.

To further explain, assume cell 102 is reusing the CPCH timeslot used by cell 104 for CPCH, which as explained above is timeslot 2, for user traffic. Cell 104 will allow cell 102 to use timeslot 2 for user traffic so long as cell 102's use of timeslot 2 does not result in degradation of CPCH performance in cell 104. This requires the system to perform the following actions: monitor CPCH performance in each cell, identify any CPCH performance degradation in a cell due to reuse of the CPCH timeslot by other cells to transmit user traffic, and finally identify the cell(s) responsible for potential CPCH performance degradation and ensure that the adequate CPCH performance level is restored. There are many ways in which a cell may monitor CPCH performance. For example, the system may collect, in each cell, CPCH quality metrics reported by each mobile. The metrics are preferably collected by base stations (BSs) operating within the system.

Examples of CPCH quality metrics specific to the Primary Common Control Physical Channel (PCCPCH), for example, include but are not limited to BCH reading time and Signal-to-Interference Ratios (SIR) perceived by a WTRU on the PCCPCH. Similarly, examples of CPCH quality metrics specific to the SCCPCH include but are not limited FACH Block Error Rate (BLER), FACH Bit Error Rate (BER), and Signal-to-Interference Ratios (SIR) perceived by a WTRU for the SCCPCH. Each CPCH quality metric collected by a cell is preferably associated with a specific area of the cell. An area of a cell can be represented as an angular section of the cell or any arbitrary division of the overall geographical area of the cell. In order for the BS of a cell to associate each CPCH quality metric it collects to a specific area of a cell, it has to be able to locate the position of the WTRU which reported the CPCH quality metric.

Possible ways in which the system can identify the location of the WTRU include but are not limited to the use of Global Positioning Systems (GPS) in the WTRU and triangulation techniques based on delay of arrivals, or measured power from neighboring BS. As each cell in the system is able to collect CPCH quality metrics from a large number of WTRUs and associate them to specific areas of the cell, the system is able to obtain, for each area of each cell, a distribution of the CPCH quality metric. An example of the form that could take this distribution is a histogram in which each bin would correspond to a small interval of the quality metric.

Prior to the system trying to reuse the CPCH timeslots for user traffic, the system collects enough statistics from the WTRUs to obtain statistically stable distributions for each area of each cell. These distributions are referred to as baseline CPCH quality distributions and will be used by the system as a comparison benchmark in order to identify any degradation in CPCH quality in any area of any cell. If the system identifies an area of a cell where CPCH performance is degraded, the system identifies the cell responsible for the interference and reduces this interference to a level which would restore the previous state where CPCH quality was deemed acceptable. To achieve this, the system preferably uses a database containing a pre-determined mapping which associates each area of each cell with its strongest interfering cell(s). Therefore, where cell 104 identifies area 108, for example, as being the area of unacceptable CPCH performance, it is evident that the cause of the degradation is cell 102's reuse of timeslot 2 for user traffic. In this case, in cell 102, timeslot 2 is identified as aggressive, meaning reuse of timeslot 2 by cell 102 has resulted in degradation of CPCH performance in the cell 104 which is using timeslot 2 to transmit its CPCH. Therefore, cell 102 has to decrement the power it is using for user traffic in timeslot 2 and is no longer able to try to increase the power at which it reuses timeslot 2 for user traffic. It is noted that cell 102 may have timeslot 2 tagged as aggressive while other cells such as, for example 106, may have timeslot 2 tagged as non-aggressive. That is, timeslot 2 may be considered aggressive with respect to cell 102, but not cell 106 meaning cell 106 can still reuse timeslot 2 for user traffic.

Figure 2:
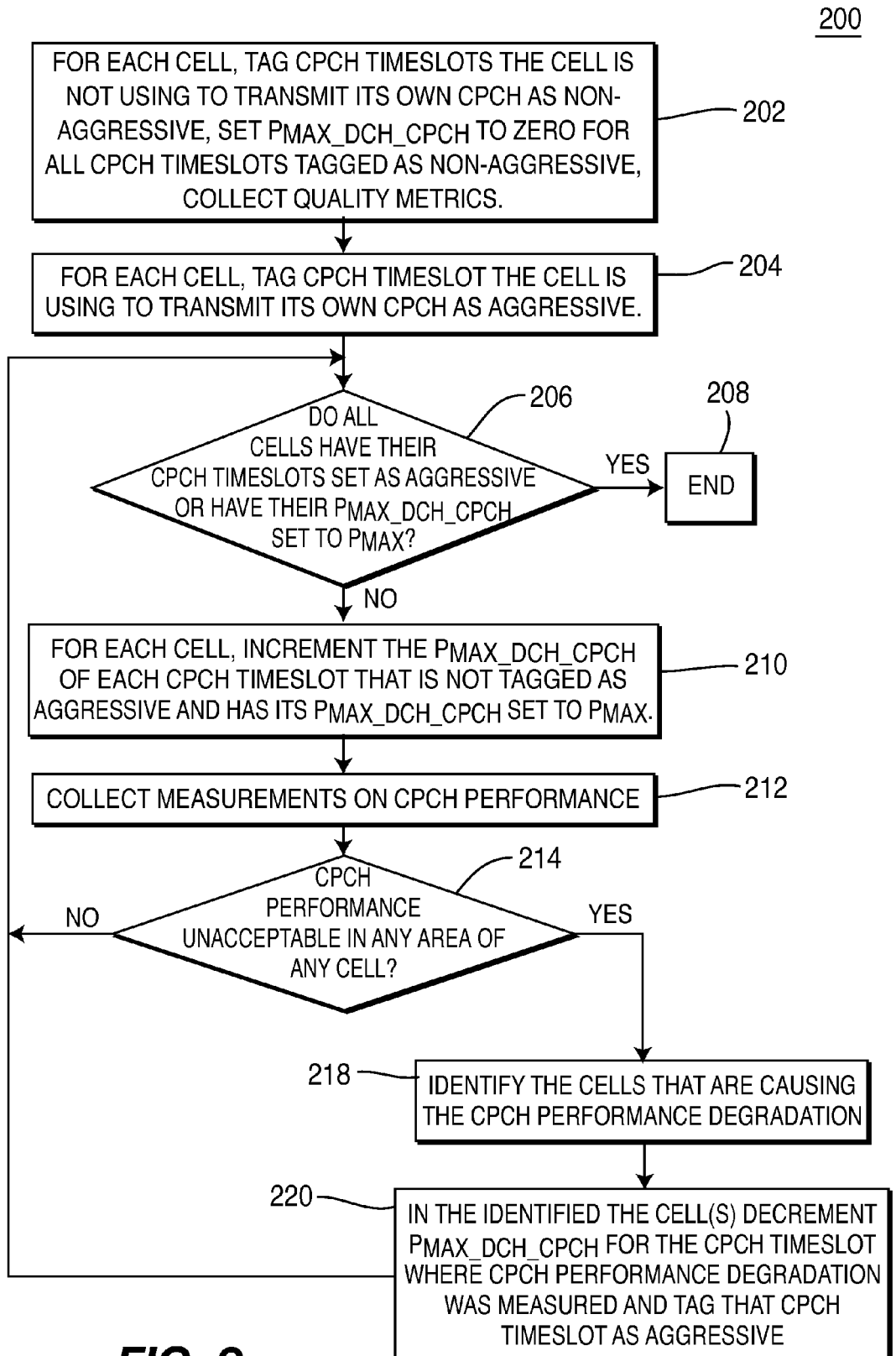
FIG. 2 is a method wherein timeslots used in a wireless communication system for transmitting Common Physical Channels (CPCH), i.e. CPCH timeslots, may be reused for user traffic.

Referring now to FIG. 2, there is shown a method 200 wherein timeslots used in a wireless communication system for transmitting the CPCH (i.e. CPCH timeslots) may be reused for user traffic. It is noted that method 200 may be implemented in any number of cells as desired. Method 200 begins with step 202 where, for each cell a tag is placed on the CPCH timeslots that the cell is not using to transmit its own CPCH. The tag identifies CPCH timeslots as being non-aggressive, meaning they are not causing degradation of another cell's CPCH performance. Also, in step 202, for each cell, the power at which the cell is permitted to transmit user traffic in a CPCH timeslot (i.e. $P_{max\_dch\_cpch}$) is set to zero for all CPCH timeslots. That is, for each cell, the $P_{max\_dch\_cpch}$ of each CPCH timeslot is set to zero. Further, in step 202, the system collects CPCH quality metrics for each area of each cell, thus obtaining statistically stable baseline distributions that will be used as benchmarks in step 214.

From step 202, the method 200 proceeds to step 204 where, for each cell, a tag is placed on the CPCH timeslot that the cell is using to transmit its own CPCH as aggressive. This will prevent a cell from handling user traffic in a CPCH timeslot that the cell is using itself for transmission of the CPCH. In step 206, it is determined whether all cells have all their CPCH timeslots either set as aggressive or have their $P_{max\_dch\_cpch}$ set to $P_{max}$ where $P_{max}$ corresponds to the maximum power a BS is allowed or able to transmit in a timeslot. For example, $P_{max}$ for a BS allowed or able to transmit up to 43 dBm is 43 dBm.

If the result of step 206 is yes, the method 200 ends in step 208. By way of explanation, when a cell has a CPCH timeslot tagged as aggressive, it indicates that the cell is already transmitting at a power beyond which it would degrade the CPCH reception of at least one of its neighboring cells. When a cell has a CPCH timeslot for which $P_{max\_dch\_cpch}$ is set to $P_{max}$, it indicates that the cell is already fully reusing this CPCH timeslot for user traffic. Therefore, if either of the above-mentioned conditions are fulfilled for all CPCH timeslots of all cells, the system is in a state where cells are not able to further increase the reuse of CPCH for user traffic. In other words, the system is in a state where cells are not able to further increase $P_{max\_dch\_cpch}$ of any of their CPCH timeslots and the method 200 ends.

If the result in step 206 is no, the method 200 proceeds to step 210. In step 210, for each cell, the $P_{max\_dch\_cpch}$ of each CPCH timeslot that is not tagged as aggressive and has its $P_{max\_dch\_cpch}$ set lower than $P_{max}$, is incremented by a predetermined amount, say P_increment. Then, in step 212, the system collects measurements on CPCH performance and obtains, for each area of each cell, distributions of CPCH quality metrics.

In step 214, it is determined whether the CPCH performance is unacceptable in any area of any cell. This is accomplished by comparing the distribution of CPCH quality measurement collected for every area of every cell with the baseline distributions collected in step 202 and identifying any area having unacceptable quality measurements. If no, the method 200 returns to step 206. If yes, the method 200 proceeds to step 218. Then, the cell(s) that are causing the CPCH performance degradation is identified (step 218). This is accomplished by looking up a database containing a predetermined mapping which associates each area within each cell to their strongest interfering cell(s) so that where degradation is identified in a particular area, the system knows who the offending cell(s) is (are). For example, referring back to FIG. 1, area 108 is mapped to cell 102.

In step 220, $P_{max\_dch\_cpch}$ of the offending cell(s) is decremented by P_increment for the CPCH timeslot where CPCH performance degradation was measured and that CPCH timeslot is tagged as aggressive with respect to the offending cell(s) identified in step 218. Once step 220 is complete, the method 200 returns to step 206.

Figure 3:
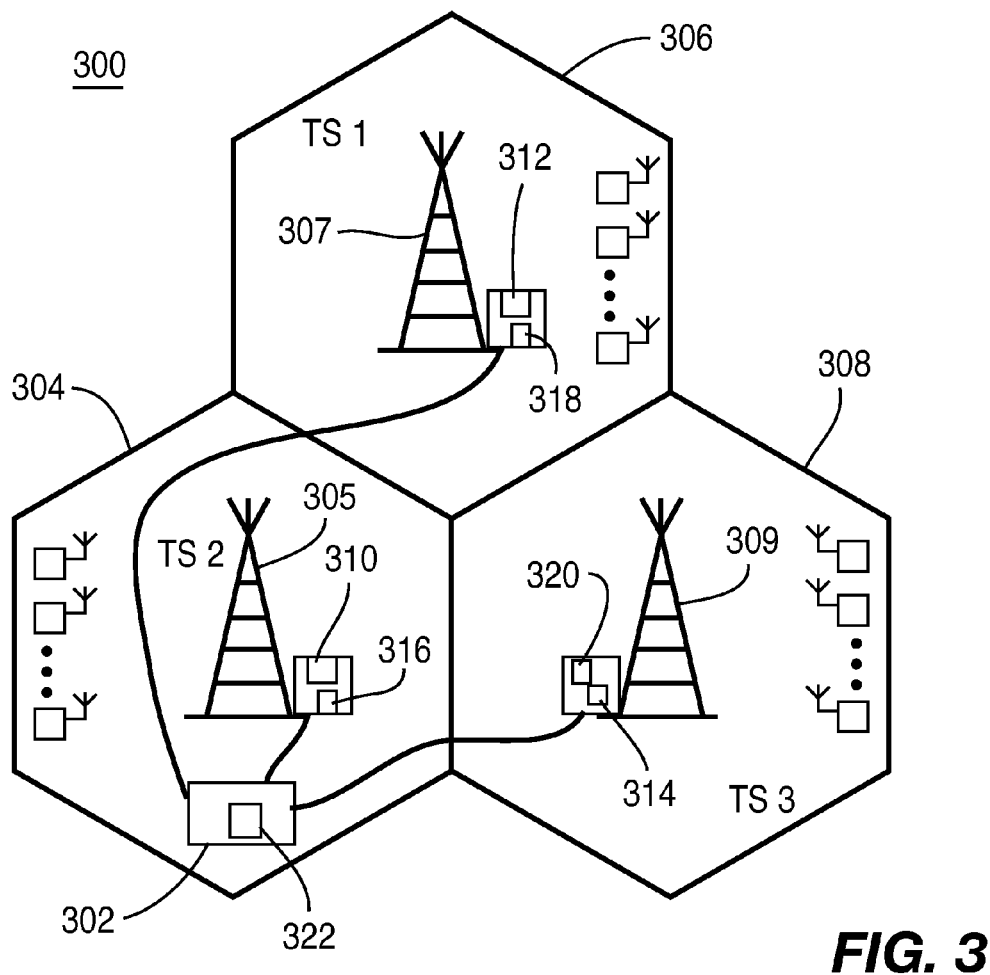
FIG. 3 is a wireless communication system wherein timeslots used in a wireless communication system for transmitting Common Physical Channels (CPCH), i.e. CPCH timeslots, may be reused for user traffic.

Referring now to FIG. 3, there is shown a wireless communication system 300 wherein timeslots used in a wireless communication system for transmitting the CPCH (i.e. CPCH timeslots) may be reused for user traffic. The system includes at least one radio network controller (RNC) 302 and a plurality of cells 304, 306, 308. In this embodiment, the system 300 is shown as being deployed with an omnidirectional deployment wherein there is a BS 305, 307, 309 for each cell 304, 306, 308. The system 300 could of course be deployed with a sectored deployment, wherein a single BS is provided for cells 304, 306, 308.

As explained above, a plurality of timeslots are typically designated as CPCH timeslots and are used by the cells for transmitting the CPCH. Assume, in this embodiment that three timeslots 1, 2, 3, have again been designated as CPCH timeslots for system 300. Therefore, all of the cells making up system 300 will transmit their CPCH in one of the three CPCH timeslots. For simplicity, only three cells 304, 306, 308 of system 300 are shown, but of course system 300 may have any number of cells as desired. Because there are only three cells, each cell may use a different CPCH timeslot for transmitting its CPCH. Where there are more cells, they will share the allocated CPCH timeslots in the same manner. That is, where there are ninety cells and three CPCH timeslots, for example, each of the ninety cells will use one of the three CPCH timeslots for transmitting its CPCH.

In system 300, assume cell 306 is transmitting its CPCH in CPCH timeslot 1, cell 304 is transmitting its CPCH in CPCH timeslot 2, and cell 308 is transmitting its CPCH in timeslot 3. For each area of each cell, CPCH performance is monitored and if it becomes unacceptable, the area within the cell where the unacceptable CPCH is concentrated is identified. Therefore, the BS 305, 307, 309 of cells 304, 306, 308 each include a processor 310, 312, 314 for collecting CPCH readings or any other metric of CPCH performance from WTRUs operating within their cell. Where CPCH is identified as being unacceptable in any of the cells, the locations of the WTRUs that are reporting the poor CPCH measurements is identified. The BS 305, 307, 309 of cells 304, 306, 308 may each include a separate processor 316, 318, 320 for locating WTRUs, or that functionality may be performed in processors 310, 312, 314.

The RNC 302 to which data collected in each cell is reported also includes at least one processor 322 for determining when CPCH has degraded to an unacceptable level and coordinating each cell's reuse of CPCH timeslots for user traffic. In coordinating each cell's reuse of CPCH timeslots for user traffic, the RNC 302 will inform each cell at which $P_{max\_dch\_cpch}$ they may transmit user traffic, if at all, in the CPCH timeslots being used by their neighboring cells to transmit CPCH. Where CPCH performance has degraded to an unacceptable level in a particular area of any particular cell, say cell 306, as a result of another cell's, say cell 308, reuse of the CPCH timeslot cell 306 is using to transmit its CPCH (i.e. CPCH timeslot 1), the RNC 302 will ensure the BS 309 of cell 308 decreases the power at which it is reusing timeslot 1 for user traffic back to a level which does not impair CPCH performance in cell 306. The RNC 302 will preferably prevent cell 308 from further increasing the power (i.e. $P_{max\_dch\_cpch}$) that is used for user traffic in CPCH timeslot 1.

It is important to note that the present invention may be implemented in any type of wireless communication system employing any type of time division duplex (TDD) technology, as desired. By way of example, the present invention may be implemented in UMTS-TDD, TDSCDMA, or any other type of wireless communication system. Further, while the present invention has been described in terms of various embodiments, other variations, which are within the scope of the invention as outlined in the claim below will be apparent to those skilled in the art.

What is claimed is:

1. A method for reusing common control channels, implemented in a wireless transmit/receive unit (WTRU), comprising:
   transmitting a quality metric on a time slot designated for control information;
   receiving a maximum power limit adjustment signal;
   adjusting transmission power in accordance with the received maximum power limit adjustment signal; and
   receiving traffic data from a base station on the time slot designated for control information within the assigned maximum limit.

2. The method of claim 1 wherein the quality metric is specific to a primary common control physical channel (PC-CPCH).

3. The method of claim 2 wherein the quality metric is measured by at least one of a broadcast channel (BCH) reading time and a signal-to-interference ratio (SIR) perceived on the PCCPCH.

4. The method of claim 1 wherein the quality metric is specific to a secondary common control physical channel (SCCPCH).

5. The method of claim 4 wherein the quality metric is measured by at least one of a fast access channel (FACH) block error rate, an FACH bit error rate, and a signal-to-interference ratio (SIR) perceived on the SCCPCH.

6. The method of claim 1 wherein the quality metric is associated with a location of the WTRU.

7. The method of claim 6 wherein the location of the WTRU is measured by at least one of a global positioning system (GPS) and triangulation techniques.

* * * * *